— 3,317,253 —
STEERING SPINDLE

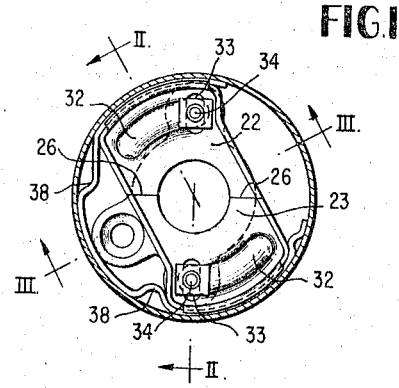

Erwin Löffler, Rommelshausen, Arthur Mähler, Fellbach, and Hans-Egon Ritterskamp, Monheim, Germany, assignors to Daimler-Benz Aktiengesellschaft, Stuttgart-Unterturkheim, Germany
Filed Nov. 19, 1963, Ser. No. 324,664
Claims priority, application Germany, Nov. 27, 1962, D 40,363
22 Claims. (Cl. 308—22)

The present invention relates to a steering spindle bearing support for motor vehicles, especially for multi-partite steering spindles, whereby the socket located at the upper end of the tubular casing for the upper steering spindle bearing rests with a flange thereof on the rim of the tubular casing.

With the known steering spindle bearing supports of this type for unitary steering spindles, that is for steering spindles made in one part, the socket of the steering spindle bearing is secured in position against a disk welded into the tubular casing, whereby the disk is provided with a hole or aperture the diameter of which is so dimensioned that the steering spindle can be inserted from above into the tubular casing. However, this type of mounting or fixing of the steering spindle bearing-socket is not applicable to multi-partite steering spindles with angularly bent or angularly offset steering columns since the upper part of the steering spindle is provided at the lower end thereof with a joint, for example, with a fork-shaped joint the diameter of which is nearly the same as the clear width of the tubular casing so that this part of the steering spindle cannot be introduced into or removed from the tubular casing without removal of the aforementioned welded-in disk.

The aim of the present invention is an easily disassemblable installation for securing in position or fixing the upper bearing of multi-partite steering spindles with angularly bent steering columns. The underlying problems are solved in accordance with the present invention in that a multi-partite support bracket engages behind an embossment which does not reduce or reduces only insignificantly the cross-section of the tubular casing or behind a similar ring welded into the tubular casing and in that the bearing socket is fixed secured in position with the aid of this support bracket against the embossment or the ring, respectively. The multi-partite support bracket may, in particular, be so constructed in accordance with the present invention that in the assembled condition thereof it resembles an oval dish, the outer rim of which is flanged over outwardly for purposes of extending behind an embossment, disk or ring, and that the support bracket is provided in the center thereof with an aperture the diameter of which is larger than that of the steering spindle and is subdivided along a diameter of this aperture while the height of the rim thereof decreases to zero in the direction toward the separating joint or gap.

As a result of the construction in accordance with the present invention of the fixing or securing arrangement for the socket of the upper steering spindle bearing, the clear width of the tubular casing is not reduced or reduced at most only insignificantly so that the multi-partite steering spindle together with the support bracket, necessary for fixing or securing in position the upper steering spindle bearing, can be inserted into the tubular casing from above.

For purposes of rapid installation and disassembly of the support bracket, the screws provided for securing or fixing the bearing socket are inserted from above through this socket and are so arranged in accordance with the present invention that the nuts of these screws are secured against rotation by the fact that one of the lateral surfaces of each nut abuts against the inner wall of the support bracket rim. According to a further feature of the present invention the support bracket parts are provided with a bead or bulge, which may be annular, adjacent the steering spindle, by means of which they are supported in the assembled and installed condition on the steering spindle bearing socket, whereby this bead or bulge is disposed closer to the steering spindle bearing than all of those points on the support bracket abutting against the disk-like ring or the embossment. With the aid of springs arranged in accordance with the present invention on the aforementioned securing screws between the bearing socket and the support bracket, the parts of the support bracket are, during loosening of the securing screws, automatically either pivoted or tilted in the downward direction about the abutment on the bearing side thereof or the entire support bracket is displaced by the springs in the downward direction out of the welded-in ring and then collapses into the individual parts of the support bracket so that the steering spindle as well as the bearing together with the socket and the support bracket can be removed at the same time out of the tubular casing. For the installation of the support bracket, the support bracket parts are provided with tongues, clips, lashing flaps or the like disposed perpendicular to the aforementioned separating gap which are so arranged that they interengage with the support bracket assembled and installed and which are bent in such a manner that in the installed condition they extend away from the steering spindle support. These tongues, clips, lashing flaps or the like form a hinge-like joint, serve for fixing the support bracket parts with respect to one another and permit a tilting of the parts during assembly and disassembly.

Accordingly, it is an object of the present invention to provide a steering spindle bearing support for motor vehicles, especially for multi-partite steering spindles which obviates by simple and inexpensive means the shortcomings and disadvantages encountered with the prior art constructions.

It is another object of the present invention to provide a steering spindle bearing support for multi-partite steering spindles, particularly for motor vehicles, which permit a simple, relatively speedy and uncomplicated installation and removal of the bearing support.

A further object of the present invention resides in the provision of a steering spindle bearing support for multi-partite steering spindles which permits ready assembly and disassembly of the steering spindle and bearing parts without requiring the installation or removal of relatively fixed parts.

Still a further object of the present invention resides in the provision of a steering spindle bearing support for multi-partite steering spindles which is so constructed and arranged as to minimize any reduction in the internal clearance of the tubular steering casing to such an extent that all the parts can be readily inserted from above for purposes of installation of the bearing.

Another object of the present invention resides in the provision of a steering spindle bearing support that can be readily assembled and disassembled without great expenditures and in a relatively short period of time.

These and further objects, features and advantages of the present invention will become more obvious from the following description when taken in connection with the accompanying drawing which shows, for purposes of illustration only, one embodiment in accordance with the present invention, and wherein:

FIGURE 1 is a plan view, from below, on the support arrangement in accordance with the present invention for securing in position the upper steering spindle bearing, taken along line I—I of FIGURE 2, FIGURE 2 is an axial longitudinal cross sectional view through the upper area of the tubular casing, taken along line II—II of FIGURE 1, FIGURE 3 is a partial cross sectional view through the upper area of the tubular casing, taken along line III—III of FIGURE 1, FIGURE 4 is a plan view, on an enlarged scale, on one part of the support bracket in accordance with the present invention, and FIGURE 5 is a cross sectional view through the one support bracket part, taken along line V—V of FIGURE 4.

Referring now to the drawing wherein like reference numerals are used throughout the various views to designate like parts, and more particularly to FIGURE 2, reference numeral 10 designates therein the upper portion of a steering spindle which is rotatably supported at the upper end thereof within a tubular casing 11 by means of a roller bearing 12. The roller bearing 12 is embedded into a socket 13 which is supported with the flange 14 thereof against the upper rim of the tubular casing 11. This steering spindle portion 10 is supported at the lower end thereof by means of the ball bearing 15 within the tapered or reduced section of the tubular casing 11, whereby this bearing 15 is held with its inner ring 16 at the steering spindle 10 in an axially non-displaceable manner by the flange 17 as well as the locking or snap ring 18. A fork-shaped joint 19 is disposed at the lower end of the steering spindle portion 10 by means of which the spindle portion 10 is pivotally connected with a further spindle portion (not illustrated) which is inclined with respect thereto. The steering wheel (not illustrated herein) is secured by means of the threaded portion 20 on the steering spindle 10 in any conventional known manner.

A sheet metal ring 21 is welded to the inside of the tubular casing 11, against which the bearing socket 13 is secured in position by means of the support bracket assembly 22, 23. This support bracket structure consists of two similar parts 22 and 23, which are preferably identical, joined to one another by relative rotation thereof through 180° from a stacked position to the planar position of FIGURE 1, and resembles an oval dish, the upper rim of which is flanged over outwardly at the two mutually oppositely disposed narrow sides 24 and 25 thereof. The support bracket 22, 23 extends by means of these outwardly flanged rims behind the ring 21 in the assembled condition of the bearing support. While a separate welded-in ring 21 is shown in the illustrated embodiment, it is understood that the same could be achieved by suitable embossments provided directly in the tubular casing itself. The support bracket 22, 23 is subdivided along the line 26 and the height of the rim thereof decreases at 39 to zero from its maximum value along the narrow sides 24 and 25 in the direction toward the separating joint 26.

The upper steering spindle bearing 12 is held with the inner ring thereof in an axially non-displaceable manner at the steering spindle 10 by means of the collar 27 of the steering spindle 10 and a clamping or locking ring 28 and is held with the outer ring 29 thereof in the socket 13 by means of a further locking ring 30. The support bracket 22, 23 is provided in the center thereof with an aperture the diameter of which is larger than the diameter of the collar 27 and the rim of which is constructed in part in a beaded or bulge-shaped manner so that the support bracket assembly 22, 23 is able to rest by means of this bulge 31 against the socket 13 of the upper steering spindle bearing.

Oblong apertures 33 which are disposed mirror-image-like with respect to the separating joint 26 are arranged within the embossments 32 of the bracket parts 22 and 23. Screws or bolts 34 inserted from above through the socket 13 extend through the elongated apertures 33, whereby the screws or bolts 34 are disposed so close to the rim of the support bracket assembly 22, 23 that the nuts 35 are secured against rotation by the fact that one of the lateral surfaces of each nut 35 nearly abuts against the rim of the support bracket assembly. Tongues or clips 36 which serve for the fixing of the support bracket parts with respect to one another are bent, as shown in FIGURE 5, in such a manner that they form hinges and permit a tilting of the support bracket parts about the abutment 31 on the bearing side thereof; the adjacent edges of the support brackets are in engagement at the line of the joint 26 so that 26 also designates their pivot axis. The tongues will form mating pairs on each side of the spindle 10. As shown in the plan view of FIGURE 4, the tongues 36 extend perpendicularly relative to the edges that form the joint 26 of FIGURE 1.

If coil springs 37 are additionally mounted over the screws 34 between the support bracket assembly 22, 23 and the bearing socket 13 which are compressed in the installed condition of the support assembly, then the disassembly of the steering spindle portion of the present invention takes place in the following manner: After the steering wheel has been removed, the screws 34 are loosened. Since the bead or bulge 31 by means of which the support bracket assembly 22, 23 is supported against the socket 13 of the upper steering spindle bearing, is disposed higher than all points in which the bracket assembly is supported against the ring 21 and the elongated apertures 33 are arranged in the radial direction, the support bracket parts 22, 23 are either tilted downwardly under the influence of the coil springs 37 about the separating joint 26 so that the flanged over rims 24 and 25 of the bracket parts 22 and 23 release the ring 21 or the entire support bracket assembly is displaced downwardly out of engagement with the welded-in ring 21 by the springs 37 and thereupon collapses into the individual parts 22 and 23. The steering spindle section 10 together with the lower bearing 15, 16, the support bracket 22, 23, the upper bearing 12 and the socket 13 thereof can be pulled out of the tubular casing 11. The ring 21 is deformed inwardly adjacent to the brackets 22 and 23 to form cams 38 for preventing rotation of the brackets 22, 23.

The installation takes place in the reverse sequence whereby the bracket parts 22 and 23 are assembled prior to installation in such a manner that the tongues or clips 36 engage with one another and the support bracket parts are mutually swung about the separating joint 26 and furthermore the support bracket assembly is arranged and located in the correct position thereof between the cams 38 of the ring 21 so that the cams 38 prevent a rotation of the support bracket assembly 22 and 23 within the tubular casing 11. Upon tightening of the screws 34 the support bracket parts 22 and 23 are pivoted or tilted about the abutment 31 on the bearing side thereof so that the flanged over rims 24 and 25 extend behind the ring 21 and are supported thereon, possibly only in the longitudinal direction of the tubular casing 11. These rims 24 and 25 as well as the bracket support area of the ring 21 may be grooved, ribbed or serrated whereby a secure seating of the support bracket assembly is assured.

While we have shown and described one embodiment in accordance with the present invention, it is understood that the same is not limited thereto, but is susceptible of numerous changes and modifications without departing from the spirit thereof as known to a person skilled in the art; and we therefore do not wish to be limited to the details shown and described herein but intend to cover all such changes and modifications as are encompassed by the scope of the appended claims.

We claim:

1. A steering spindle bearing support, especially for multi-partite steering spindles, within a tubular casing having a rim, comprising:
   a steering spindle section,
   bearing means for rotatably supporting said spindle section within said tubular casing,
   socket means for said bearing means and provided with flange means seated on the rim of said tubular casing for limiting movement of said bearing means in one axial direction, rigid internal abutment means within said tubular casing and at most only slightly reducing the cross-section of said tubular casing, and means for securing said socket means with respect to said internal abutment means including a plurality of separate inwardly collapsible support bracket means engaging said abutment means for limiting movement of said bearing means in the other axial direction.

2. A steering spindle bearing support, according to claim 1, including the assembled support bracket means resembling an oval dish having a rim, the upper portions of which are flanged over outwardly to axially engage said internal abutment means and said bracket means being further provided in the center thereof with an aperture the diameter of which is larger than that of said steering spindle section.

3. A steering spindle bearing support, according to claim 2, including said support bracket means being subdivided substantially along a diameter of said aperture and the height of the rim thereof decreasing substantially to zero in the direction toward the separating joint of said bracket means.

4. A steering spindle bearing support, according to claim 3, including said securing means including bolts inserted through said socket means, and nut means adapted to engage with said bolts and prevented against rotation by the proximity of one of the side surfaces thereof near the internal wall of said support bracket means.

5. A steering spindle bearing support, according to claim 1, including said securing means including bolts inserted through said socket means, and nut means adapted to engage with said bolts and prevented against rotation by the proximity of one of the side surfaces thereof near the internal wall of said support bracket means.

6. A steering spindle bearing support, according to claim 1, including the assembled support bracket means being further provided in the center thereof with an aperture the diameter of which is larger than that of said steering spindle section, said steering spindle section being provided with a collar resting against the inner ring of the steering spindle bearing means, said aperture having a diameter which is larger than the diameter of said collar and said support bracket means being supported against the socket means for said bearing means by means of a bead partly surrounding said aperture.

7. A steering spindle bearing support, according to claim 6, including said bead being disposed closer to the socket means of the bearing means than all those points on said support bracket means abutting against said internal abutment means.

8. A steering spindle bearing support, according to claim 6, including said securing means including screws said support bracket means being provided with elongated apertures for the screws with the longitudinal axes thereof disposed substantially radially to the tubular casing.

9. A steering spindle bearing support, according to claim 1, including the parts of said support bracket means being provided with interengaging means disposed substantially perpendicular to the separating joint of said bracket means and so arranged that they engage with one another thereby forming an assembled support bracket means.

10. A steering spindle bearing support, according to claim 9, including said interengaging means being bent in such a manner that they extend away from the bearing means with said support bracket means installed.

11. A steering spindle bearing support, according to claim 1, including said means for securing said socket means including screws inserted through said socket means, spring means arranged on the screws between said socket means and said support bracket means which are under compression with the screws tightened.

12. A steering spindle bearing support, according to claim 1, including cam means provided along said internal abutment means in such a manner as to hold said support bracket means against rotation.

13. A steering spindle bearing support, according to claim 11, including nut means adapted to engage with said screws and being prevented against rotation by the proximity of one of the side surfaces thereof near the internal wall of said support bracket means.

14. A steering spindle bearing support, according to claim 13, including the parts of said support bracket means being provided with interengaging means disposed substantially perpendicular to the separating joint of said bracket means and so arranged that they engage with one another thereby forming an assembled support bracket means, said interengaging means being bent in such a manner that they extend away from the bearing means with said support bracket means installed, and cam means provided along said internal abutment means in such a manner as to hold said support bracket means against rotation.

15. A steering spindle bearing support, according to claim 7, including said securing means including screws, said support bracket means being provided with elongated apertures for the screws with the longitudinal axes thereof disposed substantially radially to the tubular casing, the parts of said support bracket means being provided with mutual engaging means extending substantially perpendicular to the separating joint and so arranged that they engage with one another thereby forming an assembled support bracket means, said mutual engaging means being bent in such a manner that they extend away from the bearing means with said support bracket means installed.

16. A steering spindle bearing support, according to claim 15, including, lower bearing means for rotatably supporting the lower end of said spindle section within said tubular casing, the assembled support bracket means resembling an oval dish the outer rim of which is flanged over outwardly to engage said internal abutment means, and said support bracket means being subdivided substantially along a diameter of said aperture and the height of the rim thereof decreasing substantially to zero to the direction toward the separating joint, said securing means including screws inserted through said socket means, and nut means adapted to engage with said screws and being prevented against rotation by the proximity of one of the side surfaces thereof against the internal wall of said support bracket means, spring means arranged on the screws between said socket means and said support bracket means which are under compression with the screws tightened, and cam means provided along said internal abutment means in such a manner as to hold said support bracket means against rotation.

17. A steering spindle bearing support, according to claim 1, including said first-mentioned bearing means constituting upper bearing means,
lower bearing means for rotatably supporting the lower end of said spindle section within said tubular casing,
said support bracket means being assembled to form a central aperture, said steering spindle section being provided with a collar resting against the inner ring of the upper steering spindle bearing means, said aperture having a diameter which is larger than the diameter of said collar and said bracket means being supported against the socket means of the upper bearing means by means of a rim bead partly surrounding said aperture,
said bead being disposed closer to the socket means of the upper bearing means than all those points on said support bracket means abutting against said internal abutment means.

18. A steering spindle bearing support, according to claim 1, including said first-mentioned bearing means constituting upper bearing means,
lower bearing means for rotatably supporting the lower end of said spindle section within said tubular casing, 19. A steering spindle bearing support, according to claim 4, including said first-mentioned bearing means constituting upper bearing means,
lower bearing means for rotatably supporting the lower end of said spindle section within said tubular casing,
said steering spindle section being provided with a collar resting against the inner ring of the upper steering spindle bearing means, said aperture having a diameter which is larger than the diameter of said collar and said bracket means being supported against the socket means of the upper bearing means by means of a rim bead partly surrounding said aperture.
said bead being disposed closer to the socket means of the upper bearing means than all those points on said support bracket means abutting against said internal abutment means.

20. A steering spindle bearing support, according to claim 7, including said securing means including screws, said support bracket means being provided with elongated apertures for the screws with the longitudinal axes thereof disposed substantially radially to the tubular casing.

21. A steering spindle bearing support comprising: a steering spindle section; a generally tubular casing having a first internal abutment generally facing in one axial direction and a second internal abutment generally facing in the other axial direction; bearing structure means rotatably supporting said spindle section within said casing; said bearing structure means having a first external abutment means generally facing in the other axial direction and being axially abuttingly adjacent said first internal abutment for limiting movement of said bearing structure means in the other axial direction relative to said casing; said bearing structure means having second external abutment means generally facing in the one axial direction, said second external abutment means being constructed of a plurality of separate bracket means pivotally mounted for movement between a first assembled position axially abuttingly adjacent said second internal abutment for limiting movement of said bearing structure means in the one axial direction relative to said casing and a second disassembly position completely internally spaced from said second internal abutment for axial movement past said second internal abutment in said one axial direction; and means for moving said bracket means between said first and second position and between said second and first positions, and for rigidly holding said bracket means in the first assembled position.

22. The device of claim 16, wherein said steering spindle section has an enlarged diameter fork-shaped joint at one end and means for securing a steering wheel at the other end, means including said bead pivotally mounting each of said bracket means, each of said bracket means being substantially rigid, said mutual engaging means hingedly connecting said bracket means together at their inner ends, said spring means pivoting said bracket means about their respective beads when said screws are loosened from the tightened position.

References Cited by the Examiner
UNITED STATES PATENTS

| | | | |
|---|---|---|---|
| 2,731,575 | 1/1956 | Hershberger | 308—189 X |
| 2,772,550 | 12/1956 | Harrington | 64—4 |

MARTIN P. SCHWADRON, *Primary Examiner.*

DAVID J. WILLIAMOWSKY, *Examiner.*

N. ABRAMS, I. C. COHEN, *Assistant Examiners.*